United States Patent
Miller et al.

(10) Patent No.: US 7,587,606 B1
(45) Date of Patent: Sep. 8, 2009

(54) EMERGENCY WEB KEYS

(75) Inventors: Timothy R. Miller, Roseville, MN (US);
Michael J. Larsen, Bethel, MN (US);
Melanie A. Wolbeck, Lino Lakes, MN
(US); Michael J. Jost, Fridley, MN (US)

(73) Assignee: Unisys Corporation, Blue Bell, PA (US)

(*) Notice: Subject to any disclaimer, the term of this patent is extended or adjusted under 35 U.S.C. 154(b) by 803 days.

(21) Appl. No.: 10/268,296

(22) Filed: Oct. 9, 2002

(51) Int. Cl.
| | |
|---|---|
| *G06F 21/00* | (2006.01) |
| *H04K 1/00* | (2006.01) |
| *G06F 7/04* | (2006.01) |
| *H04L 9/00* | (2006.01) |
| *G06Q 50/00* | (2006.01) |
| *H04M 3/51* | (2006.01) |
| *G06F 17/50* | (2006.01) |
| *G06F 19/00* | (2006.01) |

(52) U.S. Cl. ............. 713/182; 726/2; 705/51; 380/232; 713/184
(58) Field of Classification Search .......... 726/2, 726/26, 5, 22; 380/247, 248; 713/182
See application file for complete search history.

(56) References Cited

U.S. PATENT DOCUMENTS

| | | | | |
|---|---|---|---|---|
| 6,460,023 | B1* | 10/2002 | Bean et al. | 705/54 |
| 6,704,412 | B1* | 3/2004 | Harris et al. | 379/269 |
| 7,389,424 | B2* | 6/2008 | Yasuna et al. | 713/184 |
| 2002/0161670 | A1* | 10/2002 | Walker et al. | 705/26 |
| 2003/0221011 | A1* | 11/2003 | Shitano | 709/229 |
| 2004/0039705 | A1* | 2/2004 | Svancarek et al. | 705/51 |

FOREIGN PATENT DOCUMENTS

WO WO 0101240 A2 * 1/2001

OTHER PUBLICATIONS

Stig Frode Mjølsnes, Chunming Rong, On-line e-wallet system with decentralized credential keepers, Feb. 2003, Mobile Networks and Applications, vol. 8 Issue 1, pp. 87-99.*

* cited by examiner

*Primary Examiner*—Matthew B Smithers
*Assistant Examiner*—Courtney D Fields
(74) *Attorney, Agent, or Firm*—Charles A. Johnson; Robert P. Marley; Nawrocki, Rooney & Sivertson, P.A.

(57) ABSTRACT

An apparatus for and method of efficiently adding software modules to large scale data processing systems. The customer is supplied all potentially applicable software modules upon system installation. However, each optional software module requires a key for enabling user access. Whenever the user needs an additional key on an emergency basis, it is requested via the Internet. Upon receipt of the request, the software supplier verifies entitlement of the requester to the key including licensing, payment, and configuration concerns. The key is supplied over the Internet upon verification of entitlement.

20 Claims, 10 Drawing Sheets

WEBKEYS LOGIN INFORMATION:

Requestor Information

Your PeopleSoft Identification Number: _____ 56

Sales Representative Name: _____ 58
(Last, First)

[ Submit ID and Name for E-mail addresses ] — 60

POWERED BY
Cool ICE

FIG. 4

Your Email: The.Boss@CUSTOMER.com

-- If this is not correct use your Browsers BACK button and re-submit

SELECT Correct e-mail Address for Sale representative:

Submit these E-mail addresses: [Submit] — 62

○ MAN. A. : a.man@ch.unisys.com — 64
○ MAN. Wo. : wo.man@dk.unisys.com
○ MAN. B. : b.man@unisys.com
○ MAN. C : c.man@UNISYS.com
○ MAN. W.E.. : w.e..man@UNISYS.com
○ MAN. Y. : y.man@unisys.com
○ MAN. X. : x.man@unisys.com
○ MAN. BOSS. : boss.man@dk.unisys.com
○ MAN. MAIN. : main.man@nz.unisys.com
○ MAN. G. : g.man@ch.unisys.com Submit these E-mail addresses: [Submit] — 66

FIG. 5

WEBKEYS LOGIN INFORMATION:

Billing Information

Order Number: ▭—68  (SOxxxxxxxx)

Click here to View Label with Order Number location.
▭—70

Customer Name: ▭—72   Installed At Number (Customer Number): ▭—74  (optional)

Marketing Branch Pro Number:

To log in, press this button: [Continue]—76

FIG. 6

SELECT THE SYSTEM RELEASE RFOR A LIST OF
PRODUCTS and STYLES TO SELECT

System Release ⸺ 78

| CP7.1 | CP7.0 | HMP6.1 | HMP6.0 | HMP5.1 | HMP5.0 | HMP4.2 | HMP4.1 | SB7.1 | HMP3.1 | HMP4.0 | SB7 | HMP3.0 |

FIG. 7

This is what you selected ...

Omit and Return to Selection Page — 86

Create File — 88

Create File for test only — 90

— 92

| PRODUCT | LEVEL | STYLE-ID |
|---------|-------|----------|
| ACOB | 7R3E | 6153-00 |

— 94

Your Email address is: The.Boss@CUSTOMER.com

Sales Rep Email is WoMan@Unisys.com

Order Number is SO999999

Customer Name is CUSTOMER

Customer Number iss 999999

Customer Pro Number is Boss

FIG. 9

Keys can be found in a Solar installable file on the INFO HUB System

Electronic mail will notify you of the exact file name and location.

THANKS

FIG. 10

EMERGENCY WEB KEYS

CROSS REFERENCE TO CO-PENDING APPLICATIONS

None.

BACKGROUND OF THE INVENTION

1. Field of the Invention

The present invention generally relates to data processing systems and more particularly relates to apparatus and methods for efficient reconfiguration of extremely large scale data processing systems within the field.

2. Description of the Prior Art

It is known in the art to construct and operate extremely large scale digital data processing systems. Historically, these were known as "main frame" computers wherein the primary digital data processing hardware consisted of electronic components installed into one or more steel frames which occupied a large volume within the users computer center.

As main frame computers became larger, more capable, and more expensive, manufacturers tended to make them modular in nature. The first modules were hardware. Thus, users could purchase and utilize additional memory modules, peripherals devices, instruction processors, etc. to accommodate increasing data processing demands.

In similar fashion, system component suppliers began to provide software in modular form as well. Modular software enables the user to purchase and utilize only such software capabilities as are required within a particular installation. As needs change, other software modules may be added to enhance available capabilities. However, to install an additional software module, early systems required all software to be reloaded. This reloading process was often called a system generation or "sysgen". This process was necessary to link all previous and newly added software modules to one another and to allocate available memory to all previous and newly added software modules. The primary disadvantage is the processing time lost during the complete reload of the system, because the system needed to be rendered completely inoperative during sysgen. As the systems become more complex and contain more software modules, the sysgen process takes just that much longer. Furthermore, certain individual modules may require the loading of patches to fix known software bugs. This exacerbates the problem by taking even longer.

Much more recently, repeating the sysgen process for software module additions has become just too costly. Because memory storage space is now much less expensive, it is typical to load virtually all available software into a system even though only a portion of that software is to be utilized. The user purchases a "key" to enable access to each of the software modules which are needed. The key is a small file which enables access to the corresponding software module. Whenever an additional capability is desired, the user purchases a key for the new software module to be activated within the system. In practice this involves the sending of a storage device (e.g., CD-ROM) containing the desired key via mail or courier to the user after payment is assured.

SUMMARY OF THE INVENTION

The present invention overcomes the disadvantages of the prior art by providing apparatus and methods which permits the rapid ordering, supplying, and installing of software keys using partially automated procedures. This procedure also incorporates appropriate verification procedures to prevent misuse.

To implement the preferred mode of the present invention, every customer of Unisys Corporation receives a complete set of software products. These products have been keyed to prevent unauthorized access for particular products depending upon what each customer has ordered. The keys that allow access are machine readable and are generated by the existing Unisys product called SOLAR. When a customer requests a newkey(s), the present invention utilizes an application, running under the Unisys Cool ICE system, which gathers information about the requesting customer, including order number and product identification. The new application then starts a background run that uses SOLAR to build the requested key(s) into a machine readable file. This file is mapped using the Common Internet File System (CIFS) to a DEPCON server and two electronic mail jobs are started to electronically send the two elements of this file to the Unisys Customer Service Representative. Notification of this transaction is also sent to the Unisys Billing Department for rectification.

SOLAR is the controlling program that is used to install the packaged software into a machine readable file. Once this is accomplished, CIFS enables the Unisys 2200 file structure to emulate a Microsoft file, making it very easy to attach to an e-mail sent to the requesting customer.

The key file, which is less than or equal to 10 kb in size, is attached to an e-mail which is sent directly to the user, which in this case is the Unisys Customer Service Representative. The Unisys Customer Service Representative performs a verification that the requesting customer is correctly identified and entitled to receive the key. Upon verification, the key is sent to the requesting customer via e-mail. As a result, the requesting customer is able to receive the appropriate software key(s) in approximately five minutes versus the two weeks required by the prior art approach.

In an alternative embodiment, the process may be modified to send the key(s) directly to the requesting customer without the verification process by the Unisys Customer Service Representative. However, in most cases, this will only save a couple of minutes and does offer a much lower degree of security.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 is a view of the Webkeys login page;

FIG. 5 is a view of the Select List Mail-identification page;

FIG. 6 is a view of the Customer Identification page;

FIG. 7 is a view of the System Release Select List page;

FIG. 9 is a view of the page with the selected list for CP7_1; and

FIG. 10 is a view of a typical final page.

DETAILED DESCRIPTION OF THE PREFERRED EMBODIMENTS

The present invention is described in accordance with several preferred embodiments which are to be viewed as illustrative without being limiting. These several preferred embodiments are based upon mainframe hardware components and various operating system software components available from Unisys Corporation.

Figure 1:
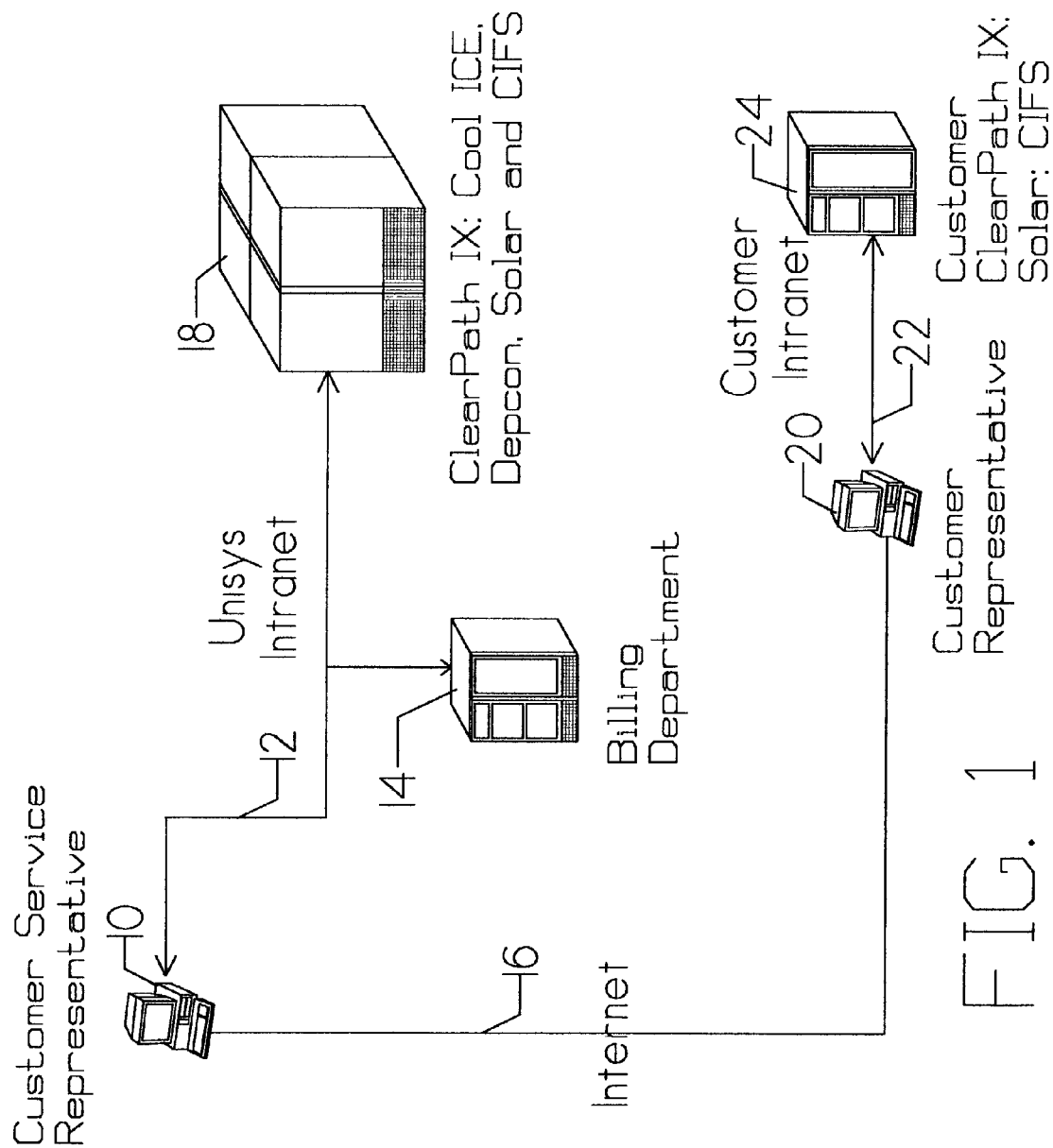
FIG. 1 is detailed pictographic diagram showing the major components of the preferred mode of practicing the present invention.

FIG. 1 is a detailed diagram showing the major hardware components of the preferred mode of practicing the present invention. Though the preferred mode involves communication over the Internet, other embodiments involving other communication networks (e.g., wireless) should be readily apparent.

Customer Service Representative user terminal 10 is a standard Internet access device and preferably an industry compatible personal computer. It is coupled to both Internet 16 and Unisys Intranet 12 as shown. Customer Service Representative user terminal 10 is operated by the Unisys Customer Service Representative as described in detail below. Also coupled to Unisys Intranet 12 is Billing Department 14 and the internal Unisys computer system 18 which employs standard products ClearPath IX, Cool ICE, DEPCON, SOLAR, and CIFS.

Also coupled to Internet 16 is Customer user terminal 20 which is also coupled to Customer Intranet 22. In the preferred mode of the present invention, the customer employs customer computer system 24 incorporating standard Unisys Corporation products ClearPath IX, SOLAR, and CIFS.

In operation, customer computer system 24 contains a software module which has been inactive, but which is now needed. An e-mail requesting a key for the needed module is sent from Customer user terminal 20 via Internet 16 to Unisys Customer Service Representative user terminal 10. The request is forwarded to Unisys computer system 18 to activate the Cool ICE run which controls the preparation of the key. SOLAR actually prepares the key and forwards it to Unisys Customer Service Representative user terminal 10 via Unisys Intranet 12. Billing Department 14 is also notified of the preparation of the key.

Verification of the request and customer authorization is made by the Unisys Customer Service Representative. Assuming proper verification, the key is attached to an e-mail which is sent via Internet 16 to Customer user terminal 20. The key is sent via Customer Intranet 22 to Customer computer system 24. The resident SOLAR program utilizes the newly received key to activate the needed software module.

Figure 2:
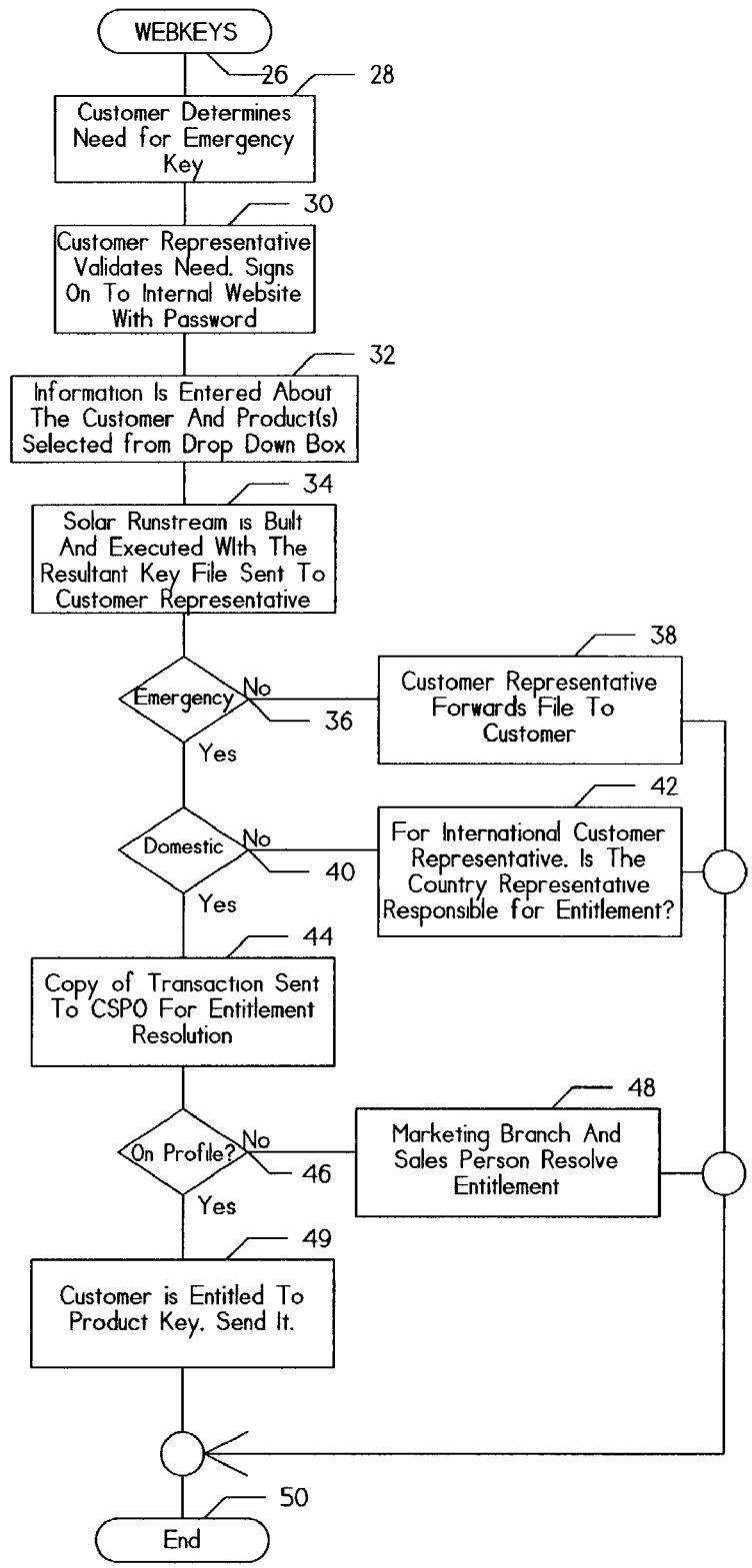
FIG. 2 is a detailed flow diagram showing the operation of the preferred mode of the present invention.

FIG. 2 is a detailed flow diagram of preferred mode of practicing the present invention. Entry is via element 26. The customer makes a determination of the need for an emergency key at element 28. This emergency may have arisen from an internal need of the customer or may have resulted from a mistake in not having received the key earlier. At element 30 the customer representative validates the need for the key and signs on to the internal web site with the appropriate password. The customer representative enters the appropriate information at element 32 to make his emergency request. The request is transferred via the Internet 16 and Unisys Intranet 12 to Unisys computer system 18 (see also FIG. 1). The Cool ICE run stream within Unisys computer system 18 activates the SOLAR software to prepare the requested key which is sent to the Unisys Customer Service Representative at element 34.

A determination is made at element 36 whether the key request involves an emergency. If not, control is given to element 38 for delivery of the key file on a physical medium in accordance with the prior art approach. If element 36 indicates an emergency, however, control is given to element 40 which determines whether this is a domestic transaction. If the request is international, control is given to element 42 for notification and handling by the international customer service representative.

If element 40 determines that it is a domestic key request, control is given to element 44 for the sending of a transaction copy for verification of entitlement. This includes both payment and licensing issues, as well as a determination that the required environment (e.g., other necessary hardware and software) is present. Element 46 makes the final determination of entitlement. If not, control is given to element 48 to enable appropriate action by company personnel. If element 46 determines entitlement, control is given to element 49 for transfer of the key via the Internet as explained above.

Figure 3:
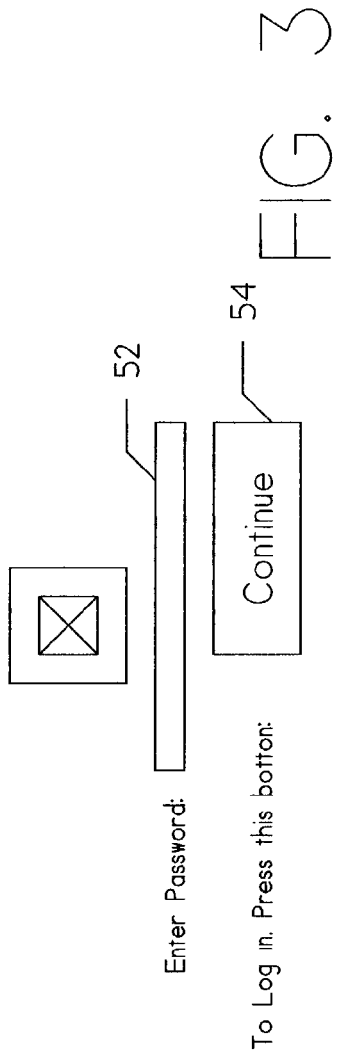
FIG. 3 is a view of the keys home page.

FIG. 3 is a view of the web keys home page. It explains the purpose and operation of the system. To utilize the system, the user must enter his/her unique password at box 52 and depress button 54. The remainder of the web keys home page is self explanatory.

FIG. 4 is a view of the web keys login page, which appears after depressing button 54 (see also FIG. 3). A user making a request must enter a peoplesoft identification number at box 56. The name of the sales representative who is the official contact of the customer is entered into box 58. Depressing button 60 continues the process.

FIG. 5 is a view of the email response page received as a result of depressing button 60 (see also FIG. 4). It is a portion of the process of verifying the identity of the requesting user. The user's sales representative is selected from list 64 by clicking on the associated radio button located in the left most position of the column. After selection, depressing button 62 or 66 sends the selection to the Unisys Customer Service Representative.

FIG. 6 is a view of the page used for entering the web keys detailed billing information. It appears on the user's screen as a result of depressing either button 62 or 66 (see also FIG. 5). The order number is entered into box 68. The hypertext link directly under box 68 offers assistance to the user in determining the correct order number.

The customer's name is entered into box 70. The optional entry of marketing branch pro number is made in box 74. Upon completion of the data entries, the user depresses button 76 to transmit the data.

FIG. 7 is a view of the page from which the user selects the system for which the emergency is to be supplied. This page is displayed to the user after button 76 is depressed (see also FIG. 6). The user selects one of the systems from column 78 by depressing the corresponding button. This selection is transmitted to the Unisys Customer Service Representative.

Figure 8:
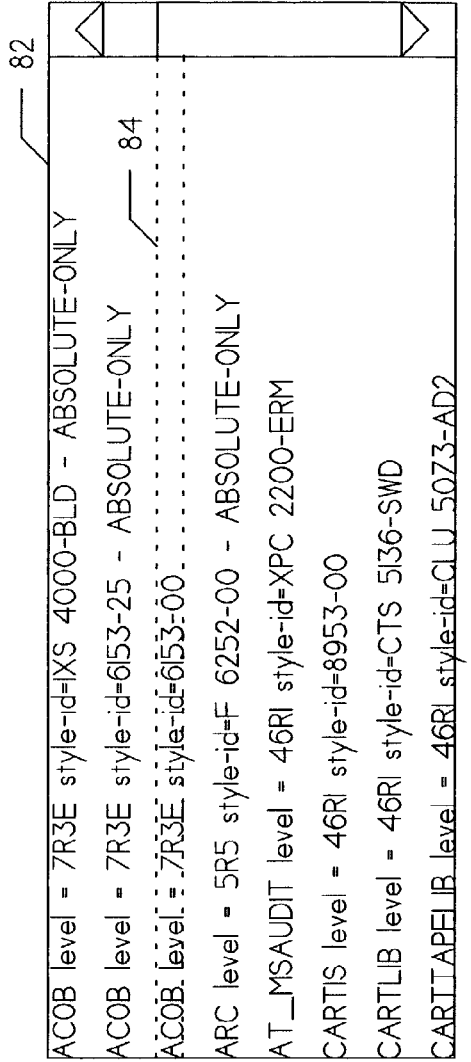
FIG. 8 is a view of the page showing the product list for CP7_1.

FIG. 8 is a view of the page from which the user selects the product(s) for which the emergency key(s) is requested. As can be seen, the user has previously selected system CP7.1 from the top of column 78 (see also FIG. 7).

Pull down list 82 contains all of the potential products available for the selected system (CP7.1 in this case). In this particular example, the user selects entry 84 by clicking on the selection. Entry 84 corresponds to ACOB level—7R3E style 6153-00.

FIG. 9 is a view of a window which recaps the user's selections. If the user is not ready, depressing button 86 returns to earlier in the process. The selections are shown in box 92. These selections may be saved for later use by depressing button 88. Depressing button go saves these selections for test purposes only. List 94 presents the rest of the information pertinent to the current transaction.

FIG. 10 is view of a sample final page. In practice, it is assumed that the final page would be decorated to a greater extent and probably contain the logo of the web key supplier.

Having thus described the preferred embodiments of the present invention, those of skill in the art will be readily able to adapt the teachings found herein to yet other embodiments within the scope of the claims hereto attached.

We claim:

1. A system for efficiently adding software modules within a large scale data processing systems comprising:
   a. a customer terminal computer operated by a customer representative responsively coupled to a system component provider terminal computer via a publicly accessible digital data communication network;
   b. a customer computer responsively coupled to said customer terminal computer;
   c. An access key provided by said system component provider terminal computer in response to a request from said customer terminal computer;
   d. A first computer program preloaded into said customer computer which is not executable by said customer computer without said access key; and
   e. A facility located within a system component provider terminal computer for verifying entitlement to said first program by said customer computer including payment, licensing, and necessary hardware and software by said customer service representative and for transferring said access key from said system component provider terminal computer via said publicly accessible digital data communication network to said customer terminal computer for subsequent transfer to said customer computer to permit said customer computer to execute said preloaded first computer program.

2. The system according to claim 1 wherein said customer terminal computer further comprises a terminal from which said customer representative requests said access key from said component provider via said publicly accessible digital data communication network.

3. The system according to claim 2 wherein said facility further comprises a utility computer which generates said access key.

4. The system according to claim 3 wherein said facility further comprises a verifier which verifies said entitlement to said access key.

5. The system according to claim 4 wherein said facility further comprises an inhibitor which prevents transfers of said access key to said customer terminal computer via said publicly accessible digital data communication network if said verifier determines lack of entitlement.

6. An apparatus for and method of efficiently adding software modules to large scale data processing systems comprising:
   a. a customer terminal computer;
   b. a publicly accessible digital data communication network responsively coupled to said customer terminal computer;
   c. an access key generated in response to a request by said customer terminal computer;
   d. a customer computer responsively coupled to said customer terminal computer;
   e. a software module preloaded into said customer computer which is not executable by said customer computer without said access key; and
   f. a component provider computer which generates and transfers said access key to said customer terminal computer via said publicly accessible digital data communication network for subsequent transfer to said customer computer to permit said customer computer to execute said preloaded software module.

7. The apparatus of claim 6 wherein said customer terminal computer further comprises a terminal from which a customer representative requests transfer of said access key from said component provider computer via said publicly accessible digital data communication network.

8. The apparatus of claim 7 wherein said component provider computer further comprises an access key generator which generates said access key.

9. The apparatus of claim 8 wherein said component provider computer further comprises a verifier which verifies entitlement to said access key.

10. The apparatus of claim 9 wherein said component provider computer further comprises an inhibitor which inhibits transfer of said access key without entitlement to said access key.

11. A method of efficiently adding software modules to a customer computer within a large scale data processing system comprising:
   a. loading said customer computer with a plurality of computer programs;
   b. preventing access to a one of said plurality of computer programs by said customer computer without an access key;
   c. requesting transfer of said access key from a component supplier computer to a customer terminal computer; and
   d. transferring said access key from said component supplier computer to said customer terminal computer via a publicly accessible digital data communication network for subsequent transfer to said customer computer.

12. A method according to claim 11 wherein said requesting step further comprises requesting transfer of said access key via said publicly accessible digital data communication network.

13. A method according to claim 12 further comprising verifying entitlement of said customer terminal computer to said access key after said requesting step and prior to said transferring step.

14. A method according to claim 13 further comprising inhibiting said transferring step if said verifying step indicates lack of entitlement.

15. A method according to claim 14 wherein said verifying step further comprises verifying payment.

16. An apparatus for efficiently adding software modules to large scale data processing systems comprising:
   a. executing means for executing a plurality of preloaded software programs;
   b. preventing means responsively coupled to said executing means for preventing execution of one of said plurality of preloaded software programs without an access key;
   c. request entry means responsively coupled to said executing means for requesting said access key; and
   d. providing means responsively coupled to said request entry means for providing said access key via a publicly accessible digital data communication network to said request entry means for subsequent transfer to said executing means.

17. An apparatus according to claim 16 wherein said request entry means further comprises a terminal for requesting said access key from said providing means by a customer representative.

18. An apparatus according to claim 17 wherein said providing means further comprises generating means for generating said access key.

19. An apparatus according to claim 18 wherein said providing means further comprises verifying means for verifying entitlement to said access key.

20. An apparatus according to claim 19 wherein said providing means further comprises preventing means for preventing transfer of said access key for lack of entitlement.

* * * * *